US011978974B2

(12) United States Patent
Buettemeyer

(10) Patent No.: US 11,978,974 B2
(45) Date of Patent: May 7, 2024

(54) ARRANGEMENT OF MODULAR PLUG CONNECTORS FOR A PRINTED CIRCUIT BOARD

(71) Applicant: HARTING ELECTRIC GMBH & CO. KG, Espelkamp (DE)

(72) Inventor: Jana Buettemeyer, Espelkamp (DE)

(73) Assignee: HARTING ELECTRIC GMBH & CO. KG (DE)

( * ) Notice: Subject to any disclaimer, the term of this patent is extended or adjusted under 35 U.S.C. 154(b) by 375 days.

(21) Appl. No.: 17/603,279

(22) PCT Filed: Mar. 16, 2020

(86) PCT No.: PCT/DE2020/100200
§ 371 (c)(1),
(2) Date: Oct. 12, 2021

(87) PCT Pub. No.: WO2020/207529
PCT Pub. Date: Oct. 15, 2020

(65) Prior Publication Data
US 2022/0224031 A1 Jul. 14, 2022

(30) Foreign Application Priority Data
Apr. 10, 2019 (DE) ..................... 10 2019 109 471.2

(51) Int. Cl.
*H01R 12/73* (2011.01)
*H01R 13/514* (2006.01)

(52) U.S. Cl.
CPC ......... *H01R 12/732* (2013.01); *H01R 13/514* (2013.01)

(58) Field of Classification Search
CPC ...... H01R 12/732; H01R 12/73; H01R 12/72; H01R 13/46; H01R 13/514
USPC ............................................................ 439/65
See application file for complete search history.

(56) References Cited

U.S. PATENT DOCUMENTS

| | | | | |
|---|---|---|---|---|
| 5,554,053 | A | 9/1996 | Matthews | 439/719 |
| 6,123,554 | A | 9/2000 | Ortega | H01R 13/514 |
| 6,383,036 | B1 | 5/2002 | Steinhauser et al. | 439/752 |
| 7,229,319 | B2 | 6/2007 | Dahms et al. | H01R 13/648 |

(Continued)

FOREIGN PATENT DOCUMENTS

| | | | |
|---|---|---|---|
| CN | 1885623 | 12/2006 | H01R 12/16 |
| DE | 10 2013 110 082 | 3/2015 | H01R 12/72 |

(Continued)

OTHER PUBLICATIONS

Search Report issued in Russian Patent Appln. Serial No. 2021131554/07, dated May 30, 2022, with machine English translation, 4 pages.

(Continued)

*Primary Examiner* — Khiem M Nguyen
(74) *Attorney, Agent, or Firm* — HAYES SOLOWAY P.C.

(57) ABSTRACT

An arrangement includes a first modular circuit board plug connector and at least one second modular circuit board plug connector for installation on a printed circuit board, wherein the circuit board plug connectors each include a plurality of individual plug connector modules and the plug connector modules are each arranged in rows on at least one connector and reversibly fastened thereto, wherein the first circuit board plug connector and the at least second circuit board plug connector are reversibly connected together via a coupling element.

13 Claims, 3 Drawing Sheets

(56) References Cited

U.S. PATENT DOCUMENTS

| | | | |
|---|---|---|---|
| 7,553,198 B1 | 6/2009 | Leddy | 439/701 |
| 8,926,365 B2 | 1/2015 | Schull et al. | 439/607.01 |
| 9,692,161 B2 | 6/2017 | Lindkamp | H01R 12/75 |
| 11,139,609 B2 | 10/2021 | Wolf | |
| 11,374,348 B2 | 6/2022 | Stremlau et al. | H01R 13/518 |
| 2005/0085110 A1 | 4/2005 | Chai et al. | H01R 12/00 |
| 2015/0200508 A1 | 7/2015 | Martin | H01R 13/42 |

FOREIGN PATENT DOCUMENTS

| | | | |
|---|---|---|---|
| DE | 20 2015 105 742 | 12/2015 | H01R 13/518 |
| DE | 202017101914 | 6/2018 | H01R 13/5214 |
| DE | 10 2017 119 287 | 2/2019 | H01R 12/71 |
| FR | 2 971 371 | 8/2012 | H01R 13/514 |
| RU | 2 144 249 | 1/2000 | H01R 13/58 |
| RU | 2 231 185 | 6/2006 | H01R 13/627 |
| RU | 2 572 607 | 1/2016 | H01R 13/514 |
| WO | WO 2012/107387 | 8/2012 | H01R 13/514 |

OTHER PUBLICATIONS

Official Action issued in Chinese Patent Appln. Serial No. 202080027839.8, dated Feb. 22, 2023, with machine English translation, 12 pages.

Official Action issued in European Patent Appln. Serial No. 20716386.6, dated Oct. 23, 2023, with machine English translation, 10 pages.

German Search Report issued in German Patent Appln. Serial No. 10 2019 109 471.2, dated Feb. 10, 2020, with machine English translation, 9 pages.

International Search Report and Written Opinion issued in PCT/DE2020/100200, dated Jun. 2, 2020, with English translation, 18 pages.

International Preliminary Report on Patentability issued in PCT/DE2020/100200, dated Sep. 28, 2021, 6 pages.

Chinese Official Action issued in Chinese Patent Appln. Serial No. 202080027839.8, dated Dec. 28. 2023, with machine English translation, 13 pages.

ARRANGEMENT OF MODULAR PLUG CONNECTORS FOR A PRINTED CIRCUIT BOARD

The invention relates to an arrangement comprising a first modular printed circuit board plug connector and at least one second modular printed circuit board plug connector.

Printed circuit board plug connectors are provided for connecting individual conductors to an associated conductor track of a printed circuit board or a so-called PCB (printed circuit board).

PRIOR ART

The publication DE 10 2013 110 082 A1 discloses a printed circuit board plug connector for producing an electrical connection between an electrical conductor and a printed circuit board. A space-saving dimensioning of the printed circuit board plug connector can be realized by means of arranging the contact elements in the insulating body. However, it is also necessary to provide different insulating bodies for different printed circuit boards.

During the priority application regarding the current application, the German Patent and Trademark Office has researched the following prior art: DE 10 2013 110 082 A1 and DE 10 2017 119 287 A1.

U.S. 6,123,554A shows a connector arrangement that consists of composed of several, individual and similar connectors is. The individual connectors are connected via a connecting element connected to each other.

WO 2015/108741A1 shows a connector that has a housing has, the cavity of which is designed with similar plug-in elements to record.

DE 10 2017 119 287A shows a modular connector for mounting on a circuit board. The connector is made up of several connector modules which can be assembled, and the connector modules can be connected to one another using a connector. This allows you to also mount modular connectors on a circuit board.

OBJECT OF THE INVENTION

The object of the invention is to propose a printed circuit board plug connector that can be used in a flexible manner and that simultaneously requires a small amount of space.

The arrangement in accordance with the invention comprises a first modular printed circuit board plug connector and at least one second modular printed circuit board plug connector. The arrangement can also comprise further printed circuit board plug connectors, for example a third and a fourth printed circuit board plug connector. The arrangement that comprises multiple modular printed circuit board plug connectors is provided for mounting on a printed circuit board.

The modular printed circuit board plug connectors are assembled in each case from multiple individual plug connector modules. The plug connector modules can be embodied differently and in particular in a manner in which the arrangement and the number of contact elements differ greatly. The different plug connector modules render it possible to assemble the modular printed circuit board plug connectors depending upon the requirement.

In accordance with the invention, the plug connector modules are in each case arranged in a row on at least one connector and fastened thereto in a reversible manner. It is preferred that the plug connector modules have for this purpose so-called dovetail guides. The connectors have a contour that matches said dovetail guides with the result that the plug connector modules can be inserted into one connector in a flush manner. A dovetail guide, also called a dovetail joint, is a connection similar to a tongue and groove joint in which the shape of the tongue (also: spring, dovetail or pin) is remotely reminiscent of the forked shape of the tail of a swallow. In contrast to a tongue and groove joint, the dovetail guide is to a greater extent positive locking, not only in a transverse manner with respect to the dovetail but also in its longitudinal direction. Said dovetail guide can absorb loadings in any direction and prevent the body, in this case the connector, from tipping over or lifting off. The advantages of the dovetail guide are further enhanced by means of the low installation height of the connector that can be achieved thereby since the connector does not require any additional space.

The connectors are preferably formed from a flat, elongated work piece. The connectors are preferably embodied from a synthetic material. The material thickness of the connector is adapted to suit the above mentioned dovetail guide.

In accordance with the invention, the first printed circuit board plug connector and the at least second printed circuit board plug connector are reversibly connected to one another by way of a coupling element. The coupling element ensures a mechanically fixed coupling or connection of the printed circuit board plug connectors to one another. As a consequence, the printed circuit board plug connector can be mounted as a so-called array onto the printed circuit board or can be plugged into a matching mating plug connector array.

In one advantageous variant of the invention the coupling elements have a cuboid shape. The coupling elements have in this case a narrow side surface or two narrow side surfaces and at least one wider cover surface. The narrow side surfaces are oriented parallel to the connector. The wide cover surface is oriented outwards.

In an alternative variant, the coupling element comprises two essentially cuboid parts that are connected to one another by way of a connecting piece. Also in this case, the cuboid parts of the coupling elements have in each case narrow side surfaces that are oriented parallel to the connectors.

It is preferred that a cuboid part of the coupling element has a coding pin or an appropriate matching coding opening so as to avoid incorrect mating connections of two printed circuit board plug connectors.

It is preferred that each modular printed circuit board plug connector has in each case two connectors. The connectors are oriented parallel to one another. The plug connector modules are arranged between the connectors. As a consequence, the plug connector modules are assembled together to form a particularly stable modular printed circuit board plug connector.

It is preferred that the length at least of one connector of the printed circuit board plug connector is longer than the length of the plug connector modules that are arranged in a row thereon. In this case, the connector protrudes in each case sideward at the edges of the plug connector modules that are arranged in a row.

It is advantageous if the length that protrudes beyond the connector in the case of the plug connector modules that are arranged in a row on said connector correspond to the width of the narrow side surfaces of the cuboid coupling elements.

It is preferred that at least one connector of the first printed circuit board plug connector and at least one connector of the second printed circuit board plug connector are connected to one another in a reversible manner by way of the coupling element. This connection can be provided for example on the protruding edge regions of the connector. As a result, space is not wasted. The printed circuit board plug connectors are finally also connected to one another by way of coupling the connectors.

In one particularly advantageous variant of the invention, two connectors of the first printed circuit board plug connector and two connectors of the second printed circuit board plug connector are connected to one another in a reversible manner by way of the coupling element. This variant is particularly stable. As a consequence, the arrangement of the printed circuit board plug connectors can be mounted in a simple manner on the printed circuit board or can be plugged into a mating plug connector.

EXEMPLARY EMBODIMENT

An exemplary embodiment of the invention is illustrated in the drawings and is explained in detail below. In the drawings.

The figures illustrate in part simplified schematic views. In part, identical reference numerals are used for similar but possibly not identical elements. Different views of the same elements may be scaled differently.

Figure 1:
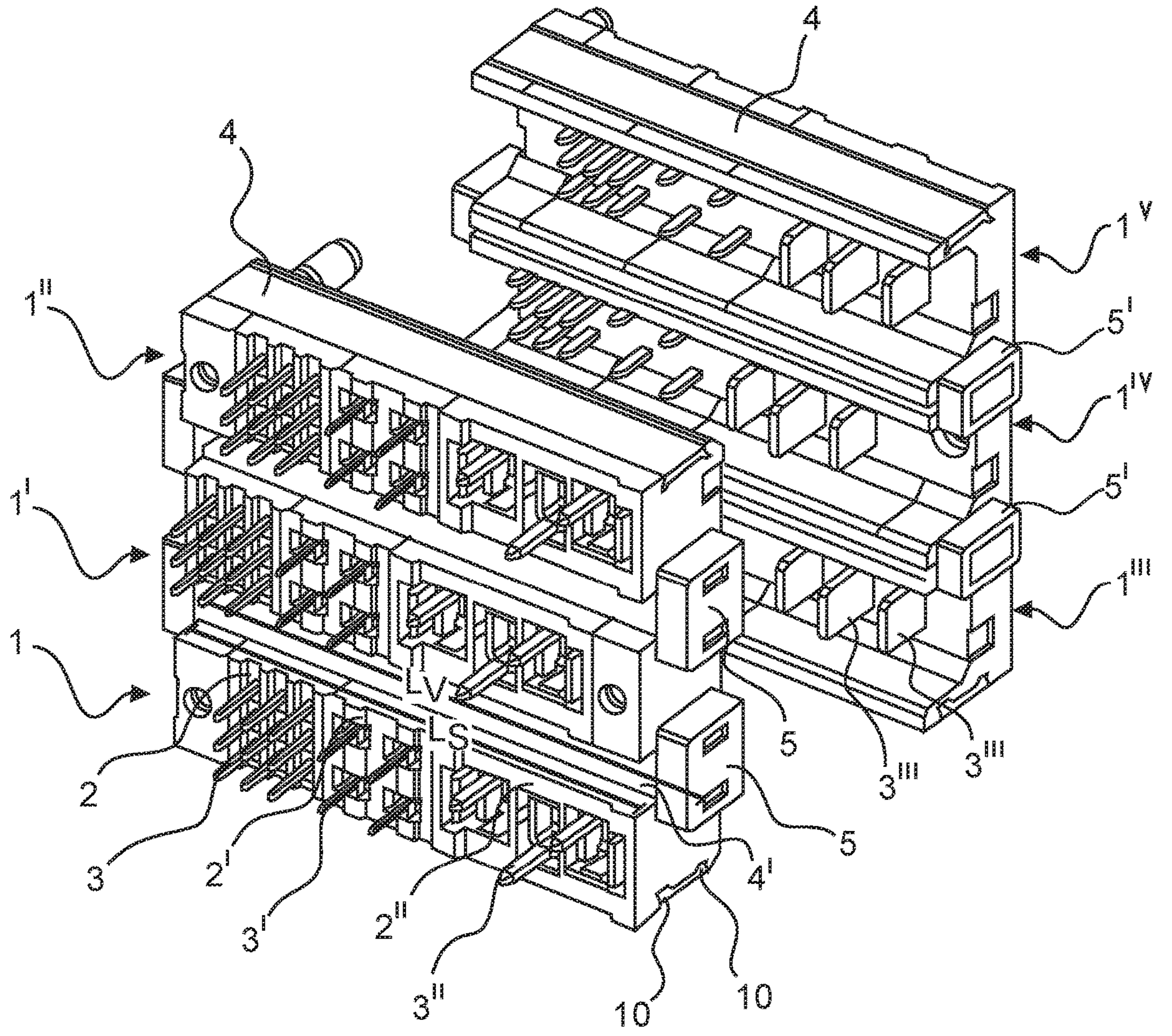
FIG. 1 illustrates a perspective view of a first exemplary embodiment of an arrangement comprising multiple modular printed circuit board plug connectors.
Figure 2:
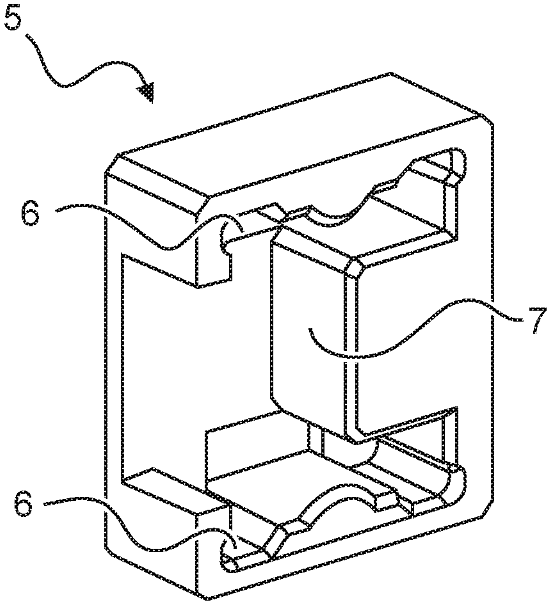
FIG. 2 illustrates a perspective view of a first exemplary embodiment of a coupling element for connecting two modular printed circuit board plug connectors.
Figure 3:
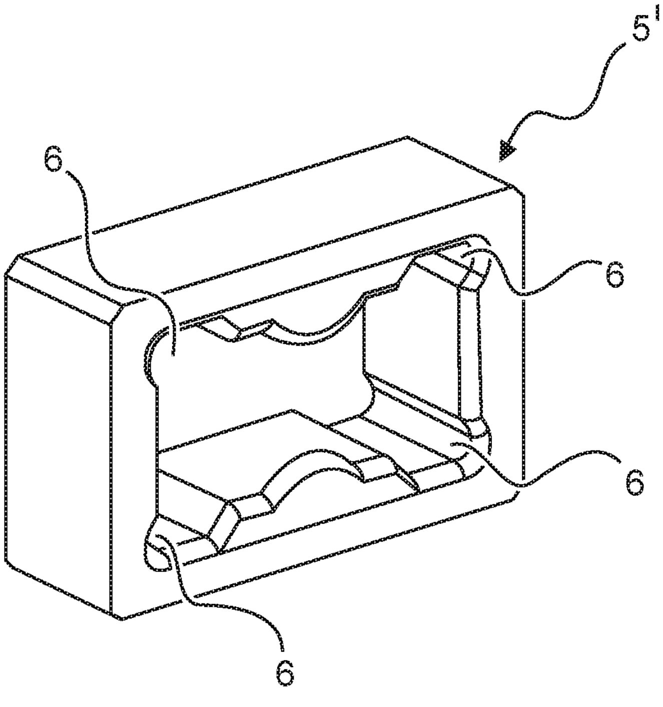
FIG. 3 illustrates a perspective view of a second exemplary embodiment of a coupling element for connecting two modular printed circuit board plug connectors.

The FIGS. 1 to 3 illustrate a first embodiment of the invention.

FIG. 1 illustrates an arrangement comprising a first modular printed circuit board plug connector 1, a second modular printed circuit board plug connector 1' and a third modular printed circuit board plug connector 1". Such an arrangement of modular printed circuit board plug connectors 1, 1', 1", is provided for mounting on a printed circuit board (not illustrated). Such a plug arrangement provides an appropriate socket arrangement that in FIG. 1 comprises the modular printed circuit board plug connectors 1'", $I^{IV}$ and $1^{V}$. Only the reference character "1" is used below for a printed circuit board plug connector 1, 1', 1", 1'", $I^{IV}$ and $1^{V}$. This then means the common features of the different embodiments.

The printed circuit board plug connectors 1 comprise in each case multiple individual plug connector modules 2, 2', 2". The plug connector modules 2, 2', 2" can be embodied differently and for example comprise different types and a different number of contact elements 3, 3'. 3". The plug connector modules 2, 2', 2" can also be embodied geometrically different from one another and for example have a different width, viewed in a transverse manner with respect to the plugging-in direction.

The plug connector modules 2, 2', 2" are in each case arranged in a row on a connector 4 and are also fastened thereto in a reversible manner by way of a dovetail profile. The first printed circuit board plug connector 1 and the second printed circuit board plug connector 1' are connected to one another in a reversible manner by way of a coupling element 5, 5'.

In the case of the plug arrangement, the coupling element 5 is connected on one side to the connector 4 and on the other side to a plug connector module 2. So as to lock on the connector 4, the coupling element 5 has an inner-lying dovetail guide 6. The connector 4 comprises an appropriate matching dovetail contour 10. So as to lock on the plug connector module 2, the coupling element 5 has an inner-lying dovetail guide 7.

In the case of the socket arrangement, the coupling element 5' is connected on one end to the connector of the first modular printed circuit board plug connector 1'" and on the other end to the connector 4 of the second modular printed circuit board plug connector $1^{IV}$. In this case, the coupling element 5' is also connected on both sides to a connector 4.

So that the coupling elements 5, 5' can be fixed on a connector 4, the length $L_V$ of the connector 4 must be greater than the length $L_S$ of the modular printed circuit board plug connector 1 ($L_V > L_S$).

Figure 4:
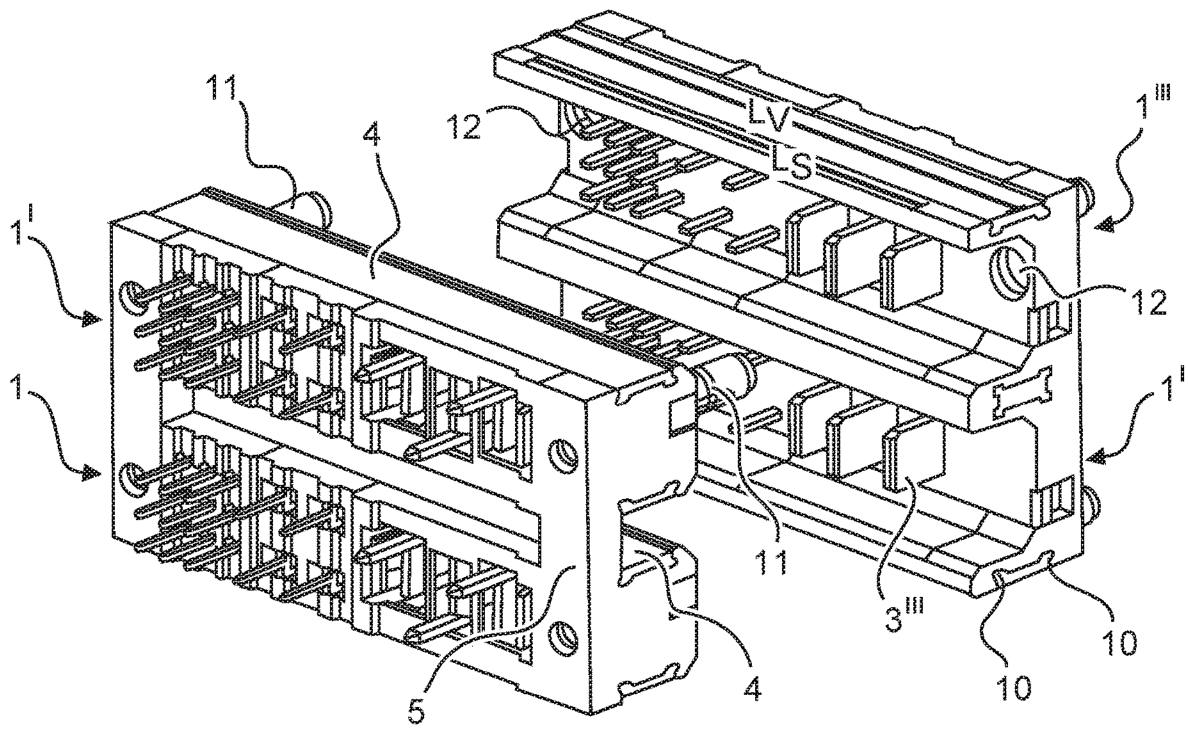
FIG. 4 illustrates a perspective view of a second exemplary embodiment of an arrangement comprising multiple modular printed circuit board plug connectors.
Figure 5:
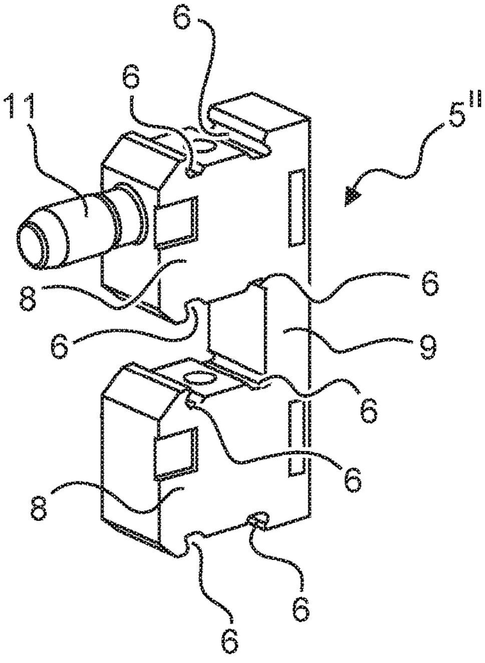
FIG. 5 illustrates a perspective view of a third exemplary embodiment of a coupling element for connecting two modular printed circuit board plug connectors and FIG. 6 illustrates a perspective view of a fourth exemplary embodiment of a coupling element for connecting two modular printed circuit board plug connectors.
Figure 6:
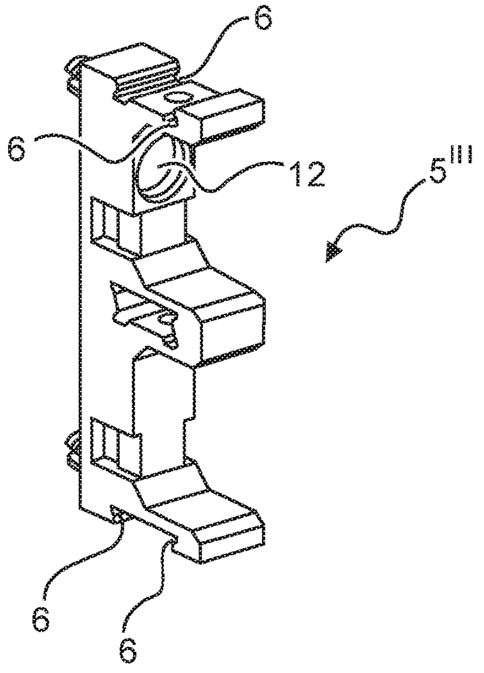

FIGS. 4 to 6 illustrate a second embodiment of the invention.

The second embodiment differs essentially by means of the coupling element 5" by means of which the modular printed circuit board plug connectors 1, 1', 1", 1'" are connected to one another. The description of this embodiment is therefore limited essentially to the differences with respect to the first embodiment.

The connector 4 protrudes on both sides beyond the plug connector modules 2, 2', 2" that are arranged in a row. This means that the length $L_V$ of the connector 4 is greater than the length $L_S$ of the plug connector modules 2, 2', 2" that are arranged in a row.

The coupling element 5" of the plug arrangement comprises two cuboid parts 8 that are connected to one another by way of a connecting piece 9. Each cuboid part 8 has two dovetail guides 6 that correspond to corresponding dovetail contours 10 of the connectors 4.

The coupling element 5" of the plug arrangement has a coding pin 1 that is inserted during the mating procedure into a coding opening 12 of the socket arrangement. As a consequence, incorrect mating connections are avoided.

The coupling element 5'" of the socket arrangement is embodied in a geometrically inverse manner to the coupling element 5" of the plug arrangement. As a consequence, the coupling elements 5" and 5'" are likewise plugged together in the mating procedure. A particularly precise guidance is achieved hereby during the mating procedure. Moreover, the pulling force of the mating connection can thereby increase and as a result the mating connection is prevented from being inadvertently separated.

Even if different aspects or features of the invention are illustrated in the figures in each case in combination, it is obvious to the person skilled in the art—unless otherwise indicated—that the illustrated and discussed combinations are not the only possible combinations. In particular, units or feature complexes of different exemplary embodiments that correspond to one another may be exchanged with one another.

Arrangement of Modular Plug connectors for a Printed Circuit Board

LIST OF REFERENCE NUMERALS

1 Module printed circuit board plug connector
2 Plug connector module
3 Contact element
4 Connector
5 Coupling element
6 Dovetail guide
7 Contour
8 Cuboid part
9 Connecting piece
10 Dovetail contour
11 Coding pin
12 Coding opening
LV Length of the connector
LS Length of the modular printed circuit board plug connector

The invention claimed is:

1. An arrangement comprising a first modular printed circuit board plug connector and at least one second modular printed circuit board plug connector wherein the arrangement is provided for mounting on a printed circuit board, wherein the modular printed circuit board plug connectors are assembled in each case from multiple individual plug connector modules, wherein the first printed circuit board plug connector and the at least second printed circuit board plug connector are connected to one another in a reversible manner by way of a coupling element, wherein the plug connector modules are in each case arranged in a row on at least one connector and are fastened thereto in a reversible manner, and at least one connector of the first printed circuit board plug connector and at least one connector of the second printed circuit board plug connector are connected to one another in a reversible manner by way of the coupling element.

2. The arrangement as claimed in claim 1, wherein
each modular printed circuit board plug connector has in each case two connectors that are oriented parallel to one another and that the plug connector modules are arranged between the connectors.

3. The arrangement as claimed in claim 1, wherein the length of the connector is greater than the length of the plug connector modules that are arranged in a row.

4. The arrangement as claimed in claim 2, wherein
two connectors of the first printed circuit board plug connector and two connectors of the second printed circuit board plug connector are connected to one another in a reversible manner by way of the coupling element.

5. The arrangement as claimed in claim 1, wherein the coupling element has a coding pin or an appropriate matching coding opening so as to avoid incorrect mating connections of two arrangements of printed circuit board plug connectors.

6. The arrangement as claimed in claim 1, wherein the plug connector modules are connected to the connector by way of a dovetail joint.

7. The arrangement as claimed in claim 2, wherein the length of the connector is greater than the length of the plug connector modules that are arranged in a row.

8. The arrangement as claimed in claim 2, wherein at least one connector of the first printed circuit board plug connector and at least one connector of the second printed circuit board plug connector are connected to one another in a reversible manner by way of the coupling element.

9. The arrangement as claimed in claim 2, wherein the coupling element has a coding pin or an appropriate matching coding opening so as to avoid incorrect mating connections of two arrangements of printed circuit board plug connectors.

10. The arrangement as claimed in claim 2, wherein the plug connector modules are connected to the connector by way of a dovetail joint.

11. The arrangement as claimed in claim 3, wherein at least one connector of the first printed circuit board plug connector and at least one connector of the second printed circuit board plug connector are connected to one another in a reversible manner by way of the coupling element.

12. The arrangement as claimed in claim 3, wherein the coupling element has a coding pin or an appropriate matching coding opening so as to avoid incorrect mating connections of two arrangements of printed circuit board plug connectors.

13. The arrangement as claimed in claim 3, wherein the plug connector modules are connected to the connector by way of a dovetail joint.

* * * * *